(12) United States Patent
Okamura

(10) Patent No.: US 6,931,115 B1
(45) Date of Patent: Aug. 16, 2005

(54) COMMUNICATION APPARATUS CAPABLE OF AUTOMATIC ACTIVATION OF FORWARDING SETUP INSTRUCTED BY REMOTE ACCESS, AND CONTROL METHOD THEREOF

(75) Inventor: Koji Okamura, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/288,351

(22) Filed: Apr. 8, 1999

(30) Foreign Application Priority Data

| Apr. 13, 1998 | (JP) | ............................................ 10-117833 |
| Apr. 22, 1998 | (JP) | ............................................ 10-128200 |
| Mar. 25, 1999 | (JP) | ............................................ 11-081753 |

(51) Int. Cl.[7] ............................................. H04M 3/42
(52) U.S. Cl. ............................... 379/207.03; 379/211.02
(58) Field of Search ........................ 379/211.02, 212.01

(56) References Cited

U.S. PATENT DOCUMENTS

| 4,475,009 A | | 10/1984 | Rais et al. .................... 179/2 A |
| 4,782,510 A | * | 11/1988 | Szlam .......................... 379/88 |
| 5,012,511 A | * | 4/1991 | Hanle et al. .................. 379/211 |
| 5,452,347 A | | 9/1995 | Iglehart et al. ............. 379/199 |
| 5,631,745 A | * | 5/1997 | Wong et al. .................. 379/96 |
| 5,729,599 A | * | 3/1998 | Plomondon et al. ........ 379/211 |
| 5,732,133 A | * | 3/1998 | Mark .......................... 379/355 |
| 5,764,639 A | * | 6/1998 | Staples et al. .............. 370/401 |
| 5,825,854 A | * | 10/1998 | Larson et al. ............. 379/93.24 |
| 5,870,465 A | * | 2/1999 | Hosbach et al. ............ 379/419 |
| 5,889,845 A | * | 3/1999 | Staples et al. .............. 379/211 |
| 5,982,870 A | * | 11/1999 | Pershan et al. ............. 379/221 |
| 6,049,601 A | * | 4/2000 | Orui ........................... 379/211 |
| 6,141,545 A | * | 10/2000 | Begeja et al. ............... 455/417 |
| 6,263,064 B1 | * | 7/2001 | O'Neal et al. ......... 379/201.01 |
| 6,320,857 B1 | * | 11/2001 | Tonnby et al. ............. 379/88.1 |

FOREIGN PATENT DOCUMENTS

WO      WO 97/31493      8/1997

OTHER PUBLICATIONS

European Search Report dated Jun. 25, 2003.

* cited by examiner

*Primary Examiner*—Creighton Smith
(74) *Attorney, Agent, or Firm*—Morgan & Finnegan, LLP

(57) ABSTRACT

A communication network is set to activate forwarding on the basis of identification information of the calling party so as to instruct to activate a forwarding function such as CFU by remote access.

The communication network is also set to activate forwarding on the basis of identification information of another communication apparatus sent from the calling party.

12 Claims, 4 Drawing Sheets

COMMUNICATION APPARATUS CAPABLE OF AUTOMATIC ACTIVATION OF FORWARDING SETUP INSTRUCTED BY REMOTE ACCESS, AND CONTROL METHOD THEREOF

BACKGROUND OF THE INVENTION

1. Field of the Invention

The present invention relates to a communication apparatus which can automatically activate the forwarding setup instructed by remote access, and its control method.

2. Description of the Related Art

As one of supplementary services of ISDN (Integrated Services Digital Network), a call forwarding unconditional (to be abbreviated as CFU hereinafter) function is known.

The user can use this CFU when he or she makes a contract with a telephone service company in advance. With this service, when the user informs the network of the telephone number of the own ISDN terminal apparatus and a forwarded-to number, the network automatically forwards an incoming call corresponding to the telephone number of the own terminal apparatus to the forwarded-to number.

In the conventional ISDN terminal apparatus with the CFU function, the user operates a console of his or her terminal apparatus to activate/deactivate CFU every time he or she wants to activate/deactivate CFU.

However, in the prior art, the user must directly operate the ISDN terminal apparatus every time he or she activates/deactivates CFU. For example, even when the user wants to activate the CFU function at a visit site, he or she cannot activate the CFU function from the visit site.

SUMMARY OF THE INVENTION

It is an object of the present invention to allow to activate a forwarding function such as CFU by remote access.

It is another object of the present invention to inform the forwarding activation result instructed by remote access.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

First Embodiment

Figure 1:
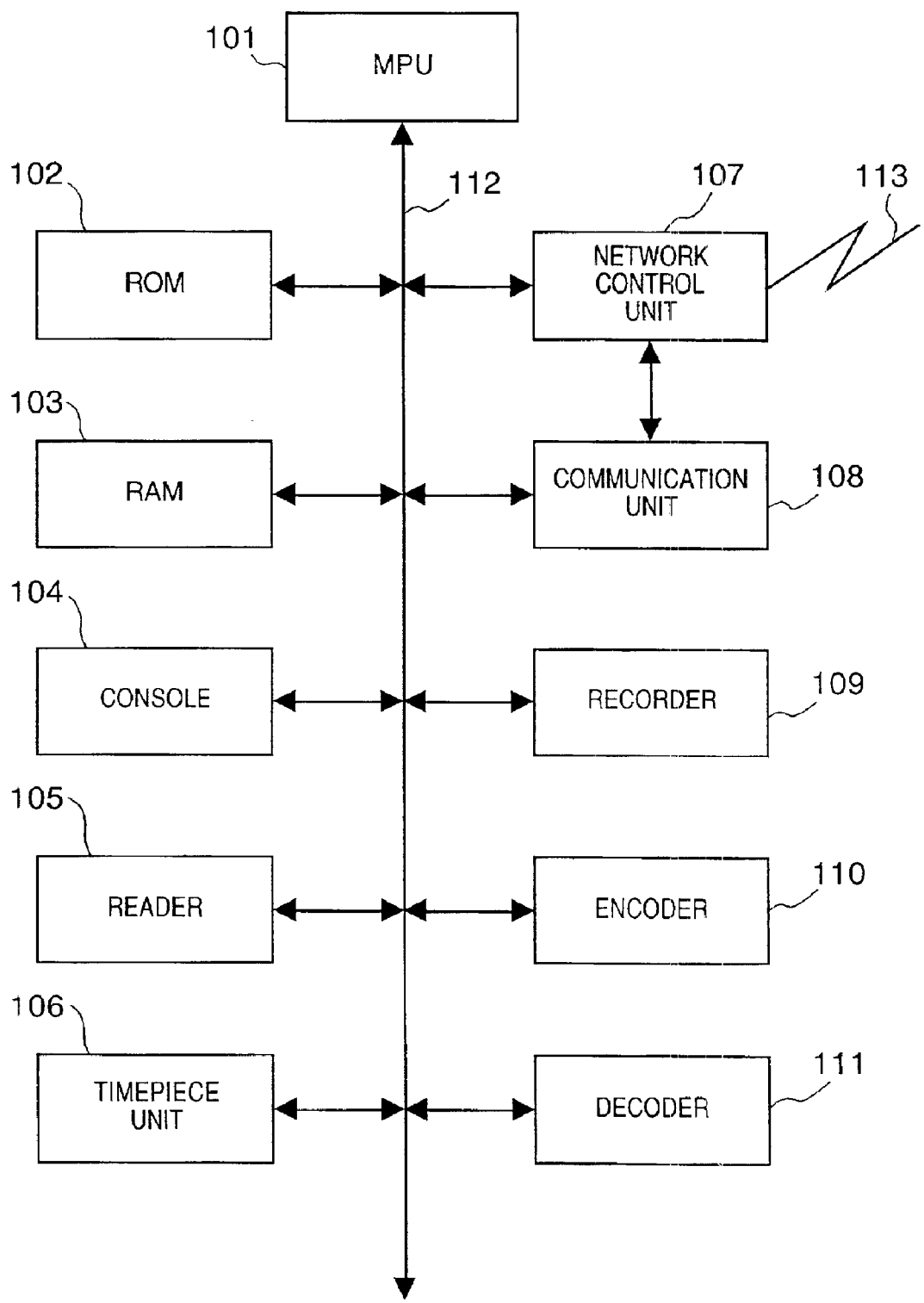
FIG. 1 is a block diagram showing the arrangement of a facsimile apparatus according to an embodiment of the present invention.

In the embodiment of the present invention, a facsimile apparatus will be exemplified as a kind of ISDN terminals in detail. FIG. 1 is a block diagram showing the arrangement of a facsimile apparatus of this embodiment.

An MPU 101 controls the overall apparatus via a system bus 112, and a ROM 102 stores a control program of the apparatus. A RAM 103 stores a remote access password, calling party number, forwarded-to number, notified-to number, destination telephone number, received image data, and the like.

A console 104 has operation keys used for making various inputs, and a display such as an LCD or the like for making various displays. A reader is a scanner for optically reading an original image. A timepiece unit 106 is a timer for measuring time, and a network control unit 107 connects or disconnects a call to or from the network.

A communication unit 108 modulates data to be transmitted to an ISDN line 113, demodulates data received from the ISDN line 113, detects a DTMF (Dual Tone Multi-Frequency) signal, generates a voice guidance message, and so forth, so as to exchange data with a partner station. A recorder 109 is a printer for recording a received image or the like.

An encoder 110 encodes image data, and a decoder 111 decodes encoded image data.

Figure 2:
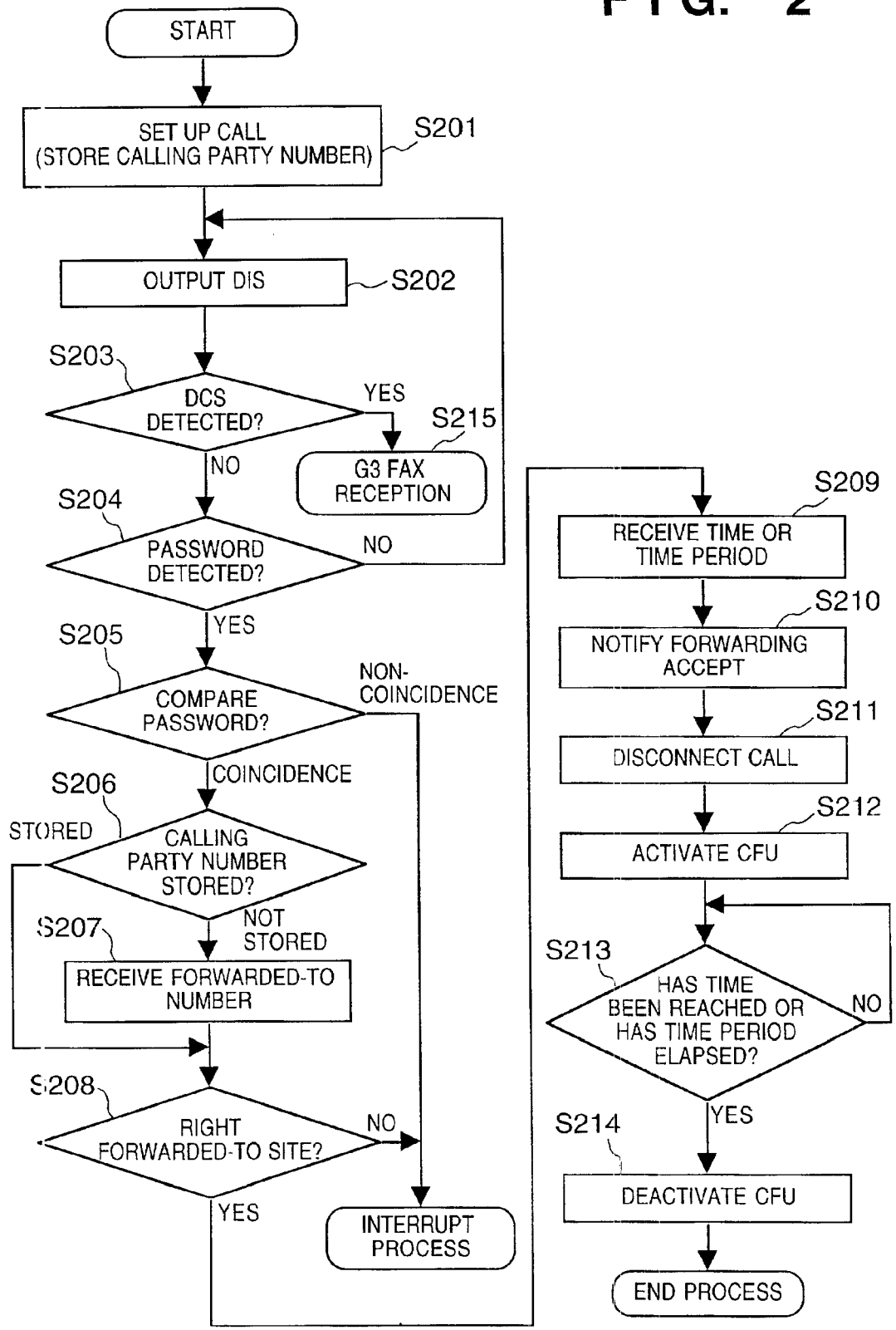
FIG. 2 is a flow chart showing the operation according to the first embodiment of the present invention.

FIG. 2 is a flow chart showing the operation upon activating CFU by remote access according to this embodiment.

In this embodiment, the user at a remote place, e.g., at a visit site, calls the facsimile apparatus of this embodiment (to be referred to as a remote-accessed facsimile hereinafter) from the handset of a facsimile apparatus to be designated as a forwarded-to site (to be referred to as a remote facsimile hereinafter) via ISDN so as to activate CFU.

In the remote-accessed facsimile, the network control unit 107 automatically sets up a call in response to SETUP from the network (S201). In this case, when the network notifies the network control unit of the calling party number, the network control unit stores this number as a forwarded-to number in the RAM 103.

The remote-accessed facsimile processes this call as a G3 communication since it is placed by a telephone, and begins to detect DCS while outputting DIS (S202, S203). At the same time, the remote-accessed facsimile starts detection of a password using a DTMF signal (S204).

Upon detecting DCS, it is determined that the calling party has requested a G3 FAX communication, and the control advances to a G3 FAX reception process (S212). Note that the G3 FAX reception process is known to those who are skilled in the art, and a detailed description thereof will be omitted.

Upon detecting the remote access password sent by the DTMF signal, the flow advances to step S205.

More specifically, when the user at the remote facsimile (calling party) confirms that a call has been set up at the remote facsimile (to open DIS), he or she sends a remote access password using a DTMF signal to remote-access the remote-accessed facsimile. Note that the user arbitrarily registers the remote access password in the remote-accessed facsimile by predetermined registration at the console 104, and the registered password is stored in the RAM 103.

Upon detecting the remote access password in step S204, the control of the remote-accessed facsimile advances to step S205 to evaluate the password. That is, the remote access password registered in advance in the RAM 103 of the remote-accessed facsimile is compared with that sent from the remote facsimile. If "non-coincidence" is detected, the call is disconnected to interrupt the process; otherwise, the flow advances to step S206.

In step S206, it is checked if the calling party number is stored in the RAM 103 as a forwarded-to number. If the network does not notify the apparatus of the calling party number upon receiving the call and no calling party number is stored in the RAM 103, the flow advances to step S207; otherwise, the flow advances to step S208.

In step S207, a forwarded-to number is received. Since the user does not know as to whether or not the remote-accessed facsimile is informed of the calling party number, a voice guidance message for prompting the user to notify the forwarded-to number is output. In place of the voice guidance message, a predetermined tone signal or the like may be output.

In response to this signal, the user outputs a forwarded-to number using a DTMF signal, and the remote-accessed facsimile stores the forwarded-to number sent from the user in the RAM 103.

If the forwarded-to number is wrong, not only the user feels inconvenient but also the user at the site which receives the call also experiences much trouble. Hence, in step S209, if the forwarded-to number is right is evaluated. More specifically, if the forwarded-to number is the calling party number notified from the network in step S201, it is unconditionally determined to be "right", and the flow advances to step S209.

However, when the forwarded-to number is notified by user's operation in step S207, that number is evaluated by combining a method of making the user confirm the number by means of a voice message, a method of comparing the forwarded-to number with destination telephone numbers registered in the remote-accessed facsimile and determining "right" if coincidence is detected, and the like.

As a result, if the forwarded-to number is right, the flow advances to step S209; otherwise, the call is disconnected to interrupt the process. In this embodiment, the call is disconnected if it is determined in step S208 that the forwarded-to number is wrong. Alternatively, the remote-accessed facsimile may ask the user to transmit the forwarded-to number again.

In step S209, the user notifies an activation time period or deactivation time for CFU using a DTMF signal or modem signal in accordance with a voice guidance message or tone signal output from the remote-accessed facsimile. The remote-accessed facsimile receives that time period or time, and stores it in the RAM 103.

In step S210, the user is informed using a voice message or tone signal that a call forwarding instruction has been normally accepted. The call is disconnected in step S211, and an activation request of CFU to the forwarded-to number stored in the RAM 103 is issued to the network in step S212.

After that, the control stays in the loop of step S213 until the time designated in step S209 is reached or the designated time period elapses, thus activating CFU.

If the time designated in step S209 has been reached or the designated time period has elapsed, the control leaves the loop in step S213, and outputs a CFU deactivation request to the network in step S214, thus ending the process.

In this manner, according to this embodiment, the user at a visit side or the like can activate the call forwarding function of the remote-accessed facsimile, and can instruct the apparatus to deactivate the call forwarding function at the designated time or after an elapse of the designated time period. Hence, the user can desirably operate the remote-accessed facsimile from a visit site to utilize the CFU function.

Second Embodiment

In this embodiment as well, a facsimile apparatus will be exemplified as a kind of ISDN terminals in detail. The arrangement of the facsimile apparatus of this embodiment is the same as that of the first embodiment shown in FIG. 1, and a detailed description thereof will be omitted.

Figure 3:
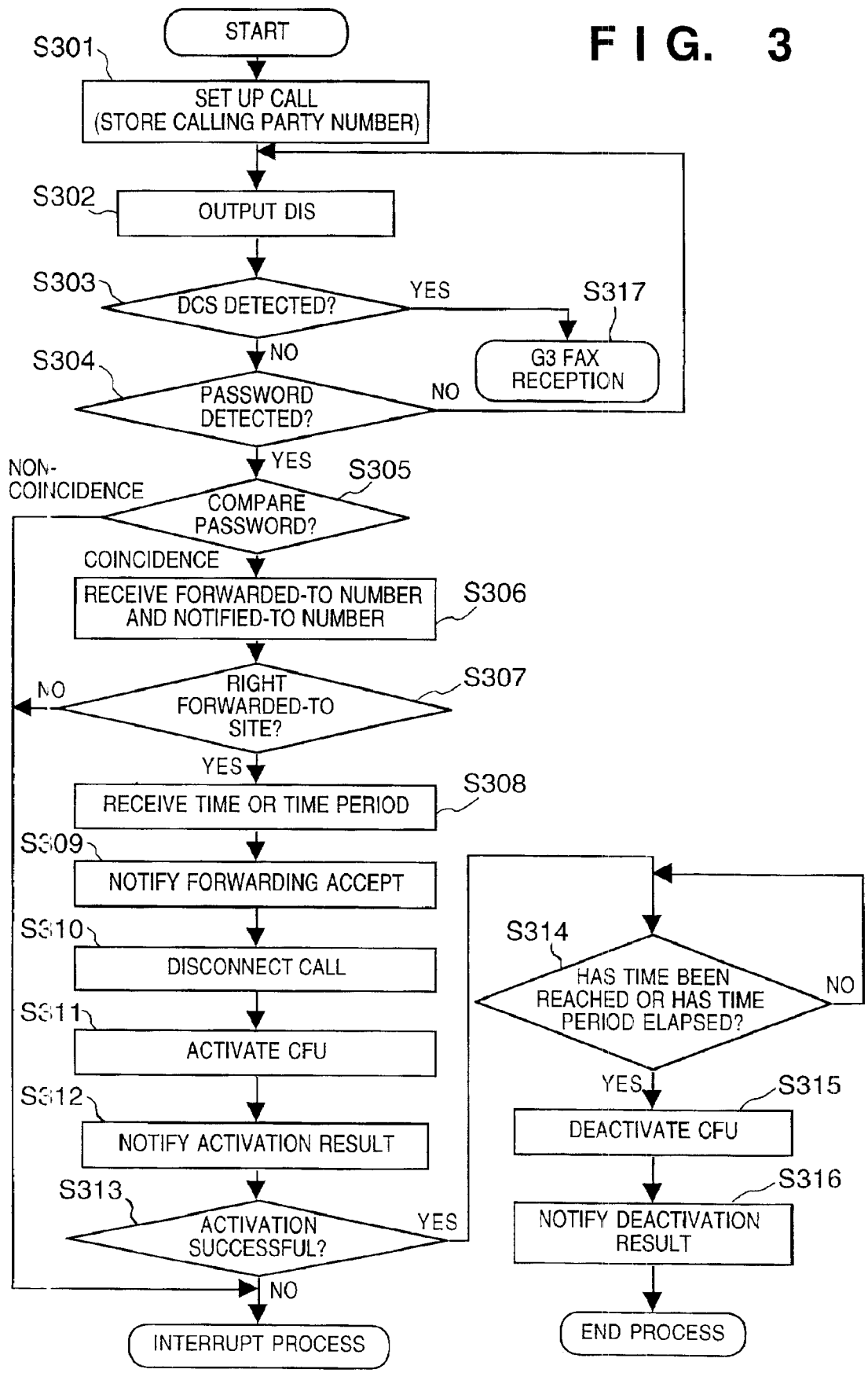
FIG. 3 is a flow chart showing the operation according to the second embodiment of the present invention.

FIG. 3 is a flow chart showing operation upon activating CFU by remote access according to this embodiment.

In this embodiment, the user at a remote place, e.g., at a visit side, calls the facsimile apparatus of this embodiment (to be referred to as a remote-accessed facsimile hereinafter) from the handset of a facsimile apparatus to be designated as a forwarded-to site (to be referred to as a remote facsimile hereinafter) via ISDN so as to activate CFU.

In the remote-accessed facsimile, the network control unit 107 automatically sets up a call in response to SETUP from the network (S301). In this case, the calling party number sent from the network is stored in the RAM 103 to prepare for a case wherein the step of outputting a forwarded-to number later is skipped.

The remote-accessed facsimile processes this call as a G3 communication since it is placed by a telephone, and begins to detect DCS while outputting DIS (S302, S303). At the same time, the remote-accessed facsimile starts detection of a password using a DTMF signal (S304).

Upon detecting DCS, it is determined that the calling party has requested a G3 FAX communication, and the control advances to a G3 FAX reception process (S317). Note that the G3 FAX reception process is known to those who are skilled in the art, and a detailed description thereof will be omitted.

Upon detecting the remote access password by the DTMF signal, the flow advances to step S305.

More specifically, when the user at the remote facsimile (calling party) confirms that the call has been set up at the remote facsimile (to open DIS), he or she sends a remote access password using a DTMF signal to remote-access the remote-accessed facsimile. Note that the user arbitrarily registers the remote access password in the remote-accessed facsimile by predetermined registration at the console 104, and the registered password is stored in the RAM 103.

Upon detecting the remote access password in step S304, the control of the remote-accessed facsimile advances to step S305 to evaluate the password. That is, the remote access password registered in advance in the RAM 103 of the remote-accessed facsimile is compared with that sent from the remote facsimile. If "non-coincidence" is detected, the call is disconnected to interrupt the process; otherwise, the flow advances to step S306.

In step S306, a forwarded-to number and notified-to number are received. The user sends the forwarded-to number and notified-to number using a DTMF signal, modem signal, or the like in accordance with a voice guidance message or tone signal output from the remote-accessed facsimile, and the remote-accessed facsimile stores the forwarded-to number and notified-to number sent from the user in the RAM 103.

In this case, sending of the notified-to number is not mandatory, and if that number is not designated, the forwarded-to number is also used as the notified-to number. Also, sending of the forwarded-to number can be skipped if the calling party number is stored in step S301 as in the first embodiment.

If the forwarded-to number is wrong, not only the user feels inconvenient but also the user at the site which receives the call also experiences much trouble. Hence, in step S307, if the forwarded-to number is right is evaluated. More specifically, if the forwarded-to number is the calling party number notified from the network in step S301, it is unconditionally determined that the forwarded-to number is "right", and the flow advances to step S308.

However, when the forwarded-to number is notified by user's operation in step S306, that number is evaluated by combining a method of making the user confirm the number by means of a voice message, a method of comparing the forwarded-to number with destination telephone numbers registered in the remote-accessed facsimile and determining "right" if coincidence is detected, and the like.

As a result, if the forwarded-to number is right, the flow advances to step S308; otherwise, the call is disconnected to interrupt the process. In this embodiment, the call is disconnected if it is determined in step S307 that the forwarded-to number is wrong. Alternatively, the remote-accessed facsimile may ask the user to transmit the forwarded-to number again.

In step S308, the user notifies an activation time period or deactivation time of CFU using a DTMF signal or modem signal in accordance with a voice guidance message or tone signal output from the remote-accessed facsimile. The remote-accessed facsimile receives that time period or time, and stores it in the RAM 103.

In step S309, the user is informed using a voice message or tone signal that a call forwarding instruction has been normally accepted. The call is disconnected in step S310, and an activation request of CFU to the forwarded-to number stored in the RAM 103 is issued to the network in step S311. At this time, the activation result notified from the network is stored in the RAM 103.

After the CPU activation request process in step S311, if the notified-to number is stored, that number is called; otherwise, the forwarded-to number is called to notify the user of the CFU activation request result stored in the RAM 103 by means of a voice message or tone signal (S312).

Note that the user may leave the forwarded-to site as soon as he or she activates CFU of the facsimile at his home or office by remote access. Hence, notification of the CFU activation request result to the user may be turned "ON/OFF" in user setups. More specifically, such CFU activation request result notification mode may be allowed to be registered in a predetermined area of the RAM 103 of the remote-accessed facsimile as a result notification mode, and notification may be skipped in decision of the remote-accessed facsimile.

Alternatively, the user may be allowed to turn on/off result notification using a DTMF signal from the remote facsimile in step S306. If "result notification ON" is selected, the notified-to number may be received, and the result notification mode may be set.

In step S313, the CFU activation request result is evaluated. If CFU activation is rejected or fails, the process is interrupted; otherwise, the flow advances to step S314.

In step S314, the control stays in the loop of step S314 until the time designated in step S308 is reached or the designated time period elapses, thus activating CFU.

If the time designated in step S308 has been reached or the designated time period has elapsed, the control leaves the loop in step S314, outputs a CFU deactivation request to the network, and stores a deactivation result sent from the network at that time in the RAM 103 in step S315.

In step S316, if the notified-to number is stored, that number is called; otherwise, the forwarded-to number is called to notify the user of the CFU deactivation result stored in the RAM 103 in step S315 by means of a voice message or tone signal, thus ending the process.

Note that the user may leave the forwarded-to site as soon as he or she activates CFU of the facsimile at his home or office by remote access. Hence, notification of the CFU deactivation result to the user may be turned "ON/OFF" in user setups. More specifically, such CFU deactivation result notification mode may be allowed to be registered in a predetermined area of the RAM 103 of the remote-accessed facsimile as a result notification mode, and notification may be skipped in decision of the remote-accessed facsimile. In this way, unwanted calls can be prevented from being placed.

Also, as in the setups of notification of the CFU activation request result, the notification mode of the CFU deactivation result may be turned "ON/OFF" using a DTMF signal from a remote facsimile.

By combining setups of this CFU deactivation result notification mode and the CFU activation request notification mode described above in step S312, either or both of CFU activation request result and CFU deactivation result can be desirably notified.

As described above, according to this embodiment, the user can issue a CFU activation request and CFU deactivation request at a designated time or after an elapse of a designated period of time from a telephone at a visit site to the remote-accessed facsimile, and can reliably recognize the CFU activation state by receiving the CFU activation request result. Furthermore, the user can also receive the CFU deactivation request result at the designated time or after an elapse of the designated period of time. Hence, after this message, the user can designate another forwarded-to site or can instruct to extend the forwarding time period, thus desirably utilizing the CFU function.

Third Embodiment

In the first and second embodiments described above, when the calling party number is received from the network upon receiving a call, the received calling party number is unconditionally used as a forwarded-to number.

However, an apparatus used for making remote access is not always used as a forwarded-to apparatus.

That is, the user may want to forward data to an apparatus different from the apparatus he or she is using to make remote access.

In this embodiment, each user who makes remote access is inquired as to whether or not the calling party number received upon reception of a call is used as a forwarded-to number, and whether or not the calling party number is used as a forwarded-to number is determined by user instruction.

With this control, the user can use the calling party number as a forwarded-to number, or when the user wants to use an apparatus different from that he or she used to place that call, he or she can designate that apparatus as a forwarded-to site apparatus.

In this embodiment as well, a facsimile apparatus will be exemplified as a kind of ISDN terminals in detail. The arrangement of the facsimile apparatus of this embodiment is the same as that of the first embodiment shown in FIG. 1, and a detailed description thereof will be omitted.

Figure 4:
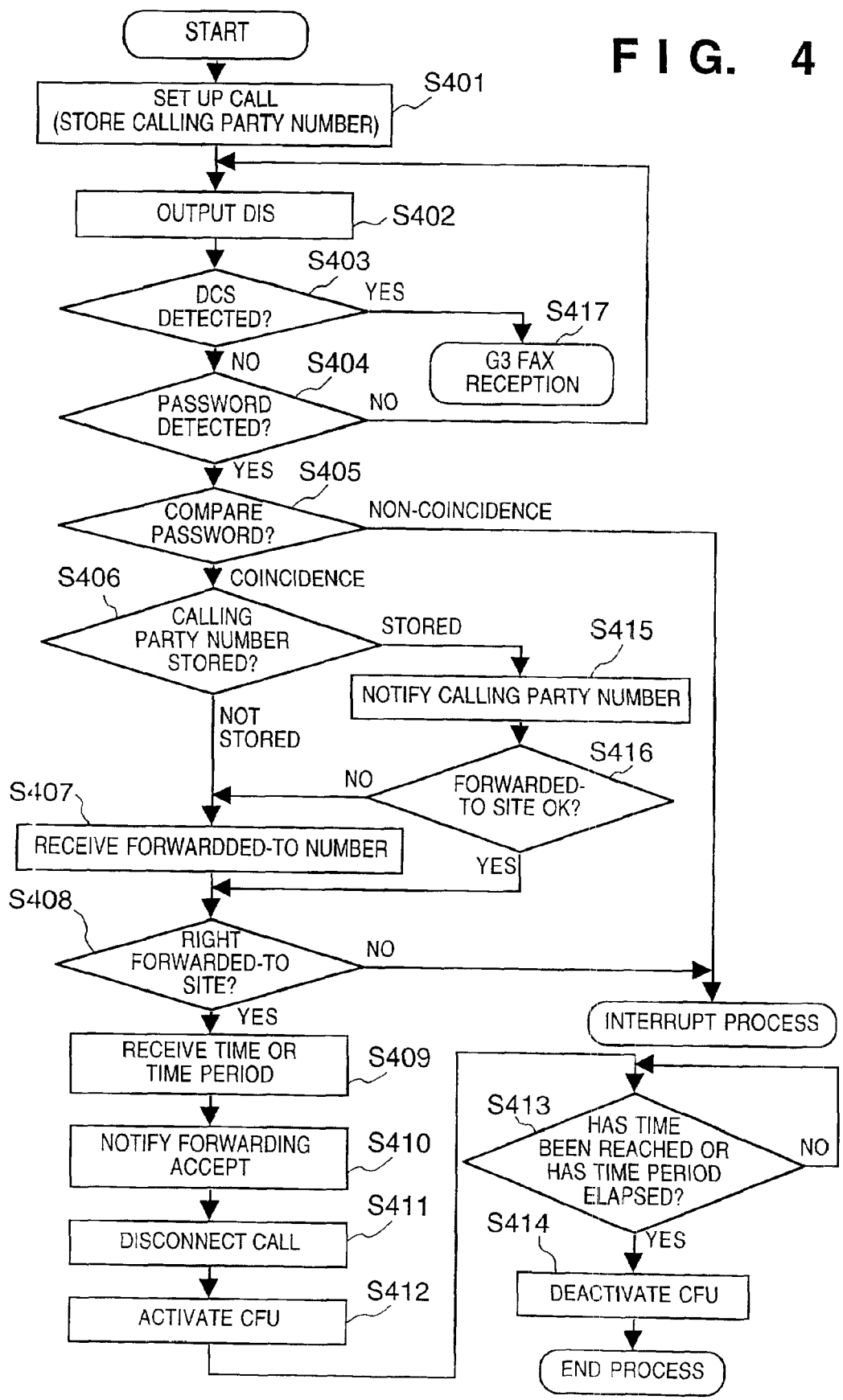
FIG. 4 is a flow chart showing the operation according to the third embodiment of the present invention.

FIG. 4 is a flow chart showing operation upon activating CFU by remote access according to this embodiment.

Note that steps S401 to S405 and S417 in FIG. 4 are the same as steps S201 to S205 and S215 in FIG. 2 described in the first embodiment, and steps S301 to S305 and S317 in FIG. 3 described in the second embodiment, and a detailed description thereof will be omitted.

In step S406 in FIG. 4 it is checked if a calling party number is stored in the RAM 103 in step S401. If no calling party number is stored, the flow advances to step S407; otherwise, the flow advances to step S415.

In step S415, the user who made access is notified of the calling party number received in step S401, and a message that inquires the user as to whether or not the calling party number is used as a forwarded-to number is transmitted.

It is then checked in step S416 based on the user's instruction using a DTMF signal if the calling party number is used as a forwarded-to number. If the calling party number is not used as a forwarded-to number, the flow advances to step S407; otherwise, the flow advances to step S408.

In step S407, a voice guidance that prompts the user who made remote access to transmit a forwarded-to number is output, and the forwarded-to number sent from the user is received. Then, the flow advances to step S408. Note that a predetermined tone signal or the like may be output in place of the voice guidance.

If the forwarded-to number is wrong, not only the user feels inconvenient but also the user at the site which receives the call also experiences much trouble. Hence, in step S408, if the forwarded-to number is right is evaluated. If it is evaluated that the received number is "right", the flow advances to step S409; otherwise, the call is disconnected to interrupt the process. As in the first and second embodiments, the control may ask the user to re-send a forwarded-to number.

Upon evaluating if the forwarded-to number is right, as in the first and second embodiments, when the forwarded-to number is the calling party number notified from the network in step S401, it is unconditionally determined that the forwarded-to number is "right"; if the forwarded-to number is received by user operation in step S407, a method of making the user confirm the number by means of a voice message, a method of comparing the forwarded-to number with destination telephone numbers registered in the remote-accessed facsimile and determining "right" if coincidence is detected, and the like are used.

In step S409, the user notifies an activation time period or deactivation time of CFU using a DTMF signal or modem signal in accordance with a voice guidance message or tone signal output from the remote-accessed facsimile. The remote-accessed facsimile receives that time period or time, and stores it in the RAM 103.

In step S410, the user is informed using a voice message or tone signal that a call forwarding instruction has been normally accepted. The call is disconnected in step S411, and an activation request of CFU to the forwarded-to number stored in the RAM 103 is issued to the network in step S412.

After that, the control stays in the loop of step S413 until the time designated in step S409 is reached or the designated time period elapses, thus activating CFU.

If the time designated in step S409 has been reached or the designated time period has elapsed, the control leaves the loop in step S413, and outputs a CFU deactivation request to the network in step S414, thus ending the process.

The above description touched upon neither CFU activation result notification nor CFU deactivation notification in the second embodiment. However, as in the second embodiment, CFU activation result notification and CFU deactivation notification may be made.

As described above, according to this embodiment, even when the calling party number is received from the network upon reception of a call, the calling party number can be used as a forwarded-to number or another telephone number can be used as the forwarded-to number.

Note that the operations described in the first to third embodiments above are done by the MPU 101 on the basis of the program stored in the ROM 102. However, according to the present invention, such program may be stored in an external storage medium such as a floppy disk, hard disk, optical disk, CD-ROM, memory card, or the like, and may be loaded into the apparatus and executed by the MPU 101.

In the above description, a standalone facsimile apparatus has been exemplified. However, the present invention is not limited to such specific apparatus, and can be similarly applied to other ISDN terminal apparatuses.

To recapitulate, according to the present invention, a forwarding activation instruction and forwarding deactivation instruction at a designated time (or after an elapse of a designated time period) can be issued by remote access from a remote place to an apparatus in which forwarding such as CFU is to be activated.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus connectable to a public network, which provides a call forwarding service and a caller identification information notifying service, comprising:

first reception device adapted to receive identification information of a calling party notified by the caller identification information notifying service when an incoming call is detected at the communication apparatus;

second reception device adapted to receive time information associated with the call forwarding service sent from the calling party, and request device adapted to request the public network to activate the call forwarding service such that an incoming call for the communication apparatus is forwarded to the calling party of the identification information received by said first reception device, by notifying the public network of the identification information received by said first reception device, and then requesting the pubic network to deactivate the call forwarding service on the basis of the time information received by said second reception device, wherein an incoming call after the request by said request device is forwarded to the calling party of the identification information by the call forwarding service of the public network.

2. The apparatus according to claim 1, wherein said first reception device can receive identification information of another communication apparatus transmitted from the calling party, and said request device can request the public network to activate the call forwarding service on the basis of the identification information of the other communication apparatus.

3. The apparatus according to claim 2, wherein said first reception device receives the identification information of the other communication apparatus depending on whether or not the identification information of the calling party is received.

4. The apparatus according to claim 2, wherein said request device requests the public network to activate the call forwarding service on the basis of the identification information of the calling party or the other communication apparatus in accordance with an instruction from the calling party.

5. The apparatus according to claim 1, wherein said request device requests the public network to activate the call forwarding service in accordance with a password sent from the calling party.

6. The apparatus according to claim 1, wherein
said request device requests the public network to activate the call forwarding service on the basis of the time information.

7. The apparatus according to claim 6, wherein the time information includes information associated with an activation time and a deactivation time of the call forwarding service.

8. The apparatus according to claim 1, further comprising:
first notification device adapted to notify an activation result of said request device.

9. The apparatus according to claim 8, wherein said notification device notifies a forwarded-to site of the result.

10. The apparatus according to claim 1, further comprising:
second notification device adapted to notify a deactivation result of said request device.

11. The apparatus according to claim 10, wherein said second notification device notifies a forwarded-to site of the result.

12. A method of controlling a communication apparatus connectable to a public network, which provides a call forwarding service and a caller identification information notifying service, comprising:

a first reception step of receiving identification information of a calling party notified by the caller identification information notifying service when an incoming call is detected;

a second reception step of receiving time information associated with the call forwarding service sent from the calling party, and a request step of requesting the public network to activate the call forwarding service such that an incoming call for the communication apparatus is forwarded to the calling party of the identification information received in said first reception step, by notifying the public network of the identification information received in said first reception step, and then requesting the public network to deactivate the call forwarding service on the basis of the time information received in said second reception step, wherein an incoming call after the request in said request step is forwarded to the calling party of the identification information by the call forwarding service of the public network.

* * * * *